United States Patent Office 3,839,499
Patented Oct. 1, 1974

3,839,499
THERMOPLASTIC POLYESTER AND POLY-BUTENE-1 MOLDING COMPOSITIONS
Hans Jadamus and Karl-Heinz Magosch, Marl, and Johannes Heuwinkel, Schermbeck, Germany, assignors to Chemische Werke Huls Aktiengesellschaft, Marl, Germany
No Drawing. Filed Aug. 1, 1972, Ser. No. 276,940
Claims priority, application Germany, Aug. 5, 1971, P 21 39 125.3
Int. Cl. C08g 39/10
U.S. Cl. 260—873     11 Claims

ABSTRACT OF THE DISCLOSURE

Thermoplastic molding compositions comprising a normally solid polyester such as polyethylene terephthalate and 0.5–10% by weight, based on the polyester, of predominantly isotactic polybutene-1 yield molded objects of improved impact strength and thermal dimensional stability.

BACKGROUND OF THE INVENTION

Field of the Invention

This invention relates to thermoplastic molding compositions. More particularly, this invention relates to a thermoplastic molding composition comprising polyethylene terephthalate and isotactic polybutene-1.

Description of the Prior Art

Molded articles of polyethylene terephthalate are known to possess, in addition to many valuable properties, an insufficient notch impact resistance which considerably impairs the use of the material as a thermoplastic synthetic resin, e.g., in the field of injection-molding processing.

Accordingly, a number of attempts have been described in the prior art to improve the Izod notch impact strength of polyethylene terephthalate by the incorporation of suitable polymeric additives thereto.

For example, German Unexamined Published Applications 1,794,036 and 1,814,073 describe the addition of rubbery copolymers optionally in the further presence of polyfunctional compounds such as polyisocyanates.

British Pat. 1,187,793 recommends the addition of certain polycarbonates. The addition of finely divided, insoluble, rubbery ethylene copolymers with vinyl acetate or acrylates has been proposed in Dutch Patent Applications 6812034 and 6817738 respectively. Belgian Pats. 720,241; 720,248; and 720,439 teach the addition of aliphatic polyesters or copolymers of unsaturated esters and dienes, optionally with the further addition of copolymers of α-olefins with α,β-unsaturated acids. These and other prior art proposals are not entirely satisfactory because the polymers blended with polyethylene terephthalate are expensive to produce and because only a limited improvement in Izod notch impact strength is obtained.

In contrast to the above proposals, German Published Applications 1,182,820 and 1,273,193 disclose the addition of up to 10% by weight, based on the polyethylene terephthalate, of high-molecular weight polypropylene or poly-4-methyl-1-pentene, in order to increase the dimensional stability of the polyethylene terephthalate; the impact strength is improved by the further addition of up to 50% by weight polyethylene. Since the addition of the polypropylene or poly-4-methyl-1-pentene component reduces the impact strength of polyethylene terephthalate, these additives must be utilized together with polyethylene to compensate for this.

The addition of stereoregular polyolefins, i.e., polypropylene and poly-4-methyl-1-pentene, to polyethylene terephthalate results in a brittle polymer blend. From this fact, it could be expected that stereoregular polybutene-1, having a monomer structure grouped in between these two polyolefins, would like wise be unsuitable. Japanese Published Patent 5,225/1971 discloses that polybutene can be added to polyethylene terephthalate in order to increase the impact strength. However, this polybutene, as with the previously discussed ethylene-propylene and polyisobutylene rubbers, is a viscous liquid or semisolid copolymer with isobutene.

It is also known to exploit the high hardness, rigidity, and thermal dimensional stability properties of polyethylene terephthalate by using the polyester in as highly a crystalline form as possible. Injection-moldings having a partially crystalline polyester content can be obtained by injecting polyethylene terephthalate into a mold pre-heated to 140° C. or higher. According to another, more cumbersome method, the polyester is injected into a cold mold, wherein it solidifies in an amorphous state. The amorphous material is normally tougher than the partially crystalline material, but exhibits a lower hardness, rigidity, and thermal dimensional stability and is thus unsuitable for many applications. This material is then crystallized by tempering, e.g. at temperatures up to 140° C., whereby it gains in hardness, rigidity, and thermal dimensional stability, but suffers a loss in impact strength. The brittleness is especially high if agents such as polypropylene or 4-methyl-1-pentene are utilized for accelerating the conversion into the thermally stable crystalline form. Whether or not such an auxiliary accelerating agent is used, the injection molded article is deformed by shrinkage to a greater or lesser extent when using this method.

OBJECTS OF THE INVENTION

Accordingly, it is an object of this invention to provide improved thermoplastic molding compositions of polyethylene terephthalate.

A further object of this invention is to provide a novel thermoplastic polymer blend.

Another object of this invention is to provide molded polyethylene terephthalate compositions having improved physical properties.

A more particular object of this invention is to provide molded polyethylene terephthalate compositions of improved notch impact strength.

Upon further study of the specification and appended claims, further objects and advantages of this invention will become apparent to those skilled in the art.

SUMMARY OF THE INVENTION

Briefly, the above and other objects are attained in one aspect of this invention by providing a thermoplastic molding composition comprising a normally solid polyester and 0.5–10% by weight, based on the polyester, of predominantly isotactic polybutene-1.

DETAILED DISCUSSION

Surprisingly, it has been found that thermoplastic polyester molding compounds, particularly those of polyethylene terephthalate, exhibit superior properties, especially with respect to the notch impact resistance, if the polyester contains 0.5 to 10% by weight of isotactic polybutene-1.

Polyesters useful in preparing the molding composition of this invention are linear, high molecular weight, normally solid thermoplastic polyesters having a saturated polyester backbone. They are solid polymers having structural units linked by ester groups, and are obtained by the condensation polymerization of a polyhydric alcohol, preferably a glycol, with an ethylenically saturated polycarboxylic acid, preferably an aromatic or aliphatic dicarboxylic acid. Such polyesters are well known in the art and include polyethylene terephthalate polyesters sold under the familiar Dacron, Mylar, and Terylene trademarks. They are preferably crystalline or crystallizable upon heating or stretching.

Suitable polyhydric alcohol polyester components include but are not limited to alkyl glycols, e.g. ethylene-, propylene-, diethylene-, dipropylene-, butylene-, and neopentylglycol; polymeric glycols, e.g. polyethylene glycol; alicyclic glycols, e.g., 1,4-cyclohexanedimethanol; etc. Of these, polyesters wherein the polyhydric alcohol is ethylene glycol are preferred.

Suitable organic acid polyester components are polycarboxylic acids or acid anhydrides, preferably those which are ethylenically saturated; such components include but are not limited to aromatic dicarboxylic acids or acid anhydrides, e.g., terephthalic acid, isophthalic acid, hexahydrophthalic acid, naphthalene-1,6-dicarboxylic acid and diphenyl-4,4'-dicarboxylic acid; aliphatic dicarboxylic acids, e.g. adipic acid, octane-dicarboxylic acid, azelaic acid, dodecanedioic acid; etc.

Most preferred as the polyester is polyethylene terephthalate which contains at least 90 molar percent of terephthalic acid and as the acid component at least 90 molar percent of ethylene glycol as the glycol component, and preferably at least 95 molar percent terephthalic acid and at least 95 molar percent ethylene glycol. The polyethylene terephthalate has a reduced specific viscosity of 0.6–1.5, preferably 0.8–1.2 dl./g. as measured in phenol/tetrachloroethane (60:40) at a concentration of 0.23 g./dl. The melt viscosities of suitable polyethylene terephthalates which contain 90–100% terephthalic acid as the acid component and 90 to 100% ethylene glycol as the glycol component range from $1.1 \times 10^3$ to $1.0 \times 10^4$ poises, preferably from $3.5 \times 10^3$ to $7 \times 10^3$ poises, as determined at 285° C., an $L:D$ (length:diameter) ratio of 10:1 and a shear rate of $10^3$ sec.$^{-1}$.

The polybutene-1 to be added according to this invention is predominantly isotactic, but can contain less than 50%, preferably less than 3% by weight of atactic portions, i.e., portions soluble in boiling diethyl ether. Preferred is polybutene-1 containing at least 97% by weight of isotactic portions.

The weight average molecular weight of polybutene-1 ranges between $10^5$ and $5 \times 10^6$, preferably between 500,000 and 2,000,000, and especially between 800,000 and $1.2 \times 10^6$, as determined by light scattering.

The polybutene-1 can contain up to 10 molar percent of a linear α-olefin comonomer, e.g., ethylene, propylene, 1-pentene, or 1-hexene.

Isotactic polybutene-1 is known in the art and can be obtained according to the well-known low-pressure method of Ziegler, as modified by Natta, e.g., by the polymerization of butene-1 in the presence of an inert hydrocarbon solvent, using mixed catalysts of alkylaluminum halides and titanium halides or vanadium halides, at polymerization temperatures of 20–100° C. of course, it is also possible to employ other known catalysts and process conditions. While working-up the polymerization product to separate catalyst residues, the content of atactic components can be adjusted in a controlled manner by selective extraction e.g., by using various amounts of lower ethers.

It is also possible to predetermine the atactic content during the polymerization reaction by utilizing catalysts of a higher or lower stereospecificity. Alternatively, desired isotactic polybutene-1 content additive can be obtained by admixing essentially pure isotactic and atactic polybutene-1.

The polybutene-1 is added to the polyethylene terephthalate in quantities of 0.5–10%, preferably 2–6% by weight based on the polyethylene terephthalate. The polybutene-1 is introduced by conventional methods, e.g., by mixing a polyolefin powder with polyester granules by tumbling in a drum mixer; by mixing the polyolefin into a polyester melt; by coextruding the polyolefin and polyester, e.g., from a twin-screw extruder, etc.

The thus-obtained mixtures of this invention can be processed directly. However, it is also possible to first subject the mixtures to a post condensation reaction in order to raise the molecular weight of the polyethylene terephthalate. In this procedure, the granulated blended material is heated to 5–100° C. below the melting point of the polyester at pressures below about 1 mm. Hg or under atmospheric pressure with the use of an inert gas, e.g., $N_2$ or $CO_2$; time periods of up to 50 hours are generally sufficient. Heating to 10–50° C. below the melting temperature of the polyester is preferred. The melting temperature is easily determined, e.g., by differential thermoanalysis. Such a post condensation reaction generally increases the molecular weight of the polyethylene terephthalate component of the blend by 50–200%.

Particularly advantageous properties are attained if the injection molding material contains a polyethylene terephthalate which has a high molecular weight, i.e., 30,000–50,000.

However, one advantage exhibited by the mixtures with polybutene-1 is that it is also possible to utilize a polyethylene terephthalate of a lower molecular weight than would be otherwise required in the case of an unmodified polyester in order to manufacture molded articles having impact strength sufficient for many purposes, e.g., molecular weights of 20,000 or even lower. Accordingly, molding compounds can be used which are easily processable, without having to consider any special shaping of the injection-molded articles.

Suprisingly, the addition of polybutene-1 according to this invention results in not only an increased notch impact resistance of the polyethylene terephthalate, but also the dimensional stability under heat is not reduced to the extent presently known at the same time.

This phenomenon is demonstrated particularly well in comparison to the high-pressure, low density polyethylene which has heretofore been considered to be the most advantageous impact strength additive. Although this additive increases the impact strength of polyethylene terephthalate, it simultaneously reduces the hardness, rigidity, and thermal dimensional stability, regardless of whether the mixture is injected into an unheated mold and then tempered, or the mixture is injected into a preheated mold.

Customary thermoplastic molding composition additives can be incorporated into the mixture of this invention, e.g., pigments, crystallization accelerators, mold release agents, reinforcing agents, or additional impact-strength improving agents. These additives are generally used in an amount of 0.05 to 100 parts per 100 parts of molding composition. Suitable additives include but are not limited to titanium dioxide, talc, calcium carbonate, gypsum, boron nitride, molybdenum disulfide, metallic phosphates, metallic stearates, waxes, ketones, polyethylene oxides, epoxy compounds, isocyanates, polycarbonates, graphite, powdered glass, fiber glass, asbestos fibers, rubbery masses, polyethylene, polyphenylene oxides, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES 1–6

The following thermoplastics were employed in Examples 1–6:

(A) Polyethylene terephthalate (PET), post-condensed for 30 hours at 230° C. and an absolute pressure of 0.1 mm. Hg in a nitrogen atmosphere. The melt viscosity of the post-condensed polyester is 4000 poises, measured in a capillary viscometer having an $L/D$ ratio of 10/1 at a shear speed [rate]

$$\dot{\gamma} = 10^3 \text{ sec.}^{-1}$$

and a temperature of 285° C.

(B) Polybutene-1 (PB-1); isotactic, atactic portion, determined as the portion soluble in boiling diethyl ether, 1%; average molecular weight $10^6$ as determined by light scattering method; (C) high-pressure polyethylene (PE): "Lupolen" 1810 H, density 0.918–0.920 g./cm.$^3$.

The materials are mixed in the proportions set forth in the table, and homogenized and granulated in a twin-screw extruder. The resultant mixtures are dried to a water content of below 0.01% and injection-molded under identical conditions (cylinder temperature 270° C.; mold temperature 150° C.; cycle 1 minute), to obtain standard, small rods and 30 x 30 x 4 mm. plates. The thermal dimensional stability is determined in the following manner: The small standard rod is laid flat on two supports (spacing 40 mm.) and stressed in the center with a flexural load of 18.5 kp./cm.$^2$. This arrangement is heated in a silicone bath at a rate of 2° C./min. The temperature at which the bending amounts to 1 mm. is indicated in the table. The other values are determined in accordance with DIN (German Industrial Standard), test methods indicated. The results are tabulated in Table 1.

TABLE 1

| Example number | Additive talc, percent | Polyolefin addition | Notch impact strength, DIN 53453, cm. kp.·cm.$^{-2}$ | Critical bending stress, DIN 53452, kp.·cm.$^{-2}$ | Ball identation hardness, DIN 53456, 10″/60″, kp.·cm.$^{-2}$ | Thermal dimensional stability; ° C. |
|---|---|---|---|---|---|---|
| 1 | | | 2.0 | 1,380 | 1,620/1,560 | 169 |
| 2 | 0.1 | 5% PE | 3.0 | 1,240 | 1,400/1,370 | 157 |
| 3 | 0.1 | 10% PE | 2.9 | 1,070 | 1,350/1,300 | 145 |
| 4 | | 5% PB-1 | 3.3 | 1,290 | 1,510/1,460 | 161 |
| 5 | 0.1 | 5% PB-1 | 3.2 | 1,260 | 1,510/1,440 | 164 |
| 6 | 0.1 | 10% PB-1 | 3.3 | 1,100 | 1,210/1,170 | 148 |

EXAMPLES 7–10

The same procedure is followed as set forth in Examples 1–6, but polyethylene terephthalates of higher melt viscosities are employed (measured under the above conditions) which additionally contain 0.5% $TiO_2$. Considerable increases in notch impact resistance are observed in these cases as well due to the addition of polybutene-1. The results are tabulated in Table 2.

TABLE 2

| Ex. No. | Viscosity in poises | Additive | Notch impact resistance, DIN 53453, cm. kp.·cm.$^{-2}$ | Critical bending stress, DIN 53452, kp.·cm.$^{-2}$ | Ball indentation hardness, DIN 53456, 10″/60″, kp.·cm.$^{-2}$ |
|---|---|---|---|---|---|
| 7 | 5,000 | | 2.3 | 1,400 | 1,500/1,450 |
| 8 | 5,000 | 5% PB-1 | 4.2 | 1,300 | 1,450/1,400 |
| 9 | 7,000 | | 3.0 | 1,300 | 1,500/1,450 |
| 10 | 7,000 | 5% PB-1 | 5.5 | 1,250 | 1,450/1,400 |

EXAMPLES 11–20

Corresponding results are obtained by proceeding as described in Examples 1–10, but employing polyethylene terephthalates wherein 5 molar percent of the terephthalic acid is substituted by isophthalic acid, and 5 molar percent of the ethylene glycol is substituted by 1,4-cyclohexanedimethanol.

In these cases the addition of the isophthalic acid causes an increase of the notch impact strength; by using lower amounts of 1,4-cyclohexanedimethanol the injection molding cycles are shortened.

EXAMPLES 21–25

Corresponding results are achieved by proceeding as described in Examples 1–10, but employing, in place of the polybutene utilized therein, a polybutene-1 having a molecular weight of $1.2 \cdot 10^6$ and an atactic proportion of 5%, determined as the portion soluble in boiling diethyl ether, in a concentration of 3%. The effects on notch impact strength values are only in substantially lesser than in Examples 1–10.

EXAMPLES 26–30

By proceeding as set forth in Examples 1–10, but varying the molecular weights of polybutene-1 between 800,000 and $1.2 \cdot 10^6$, corresponding results are obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermoplastic molding composition which yields molded objects of improved impact strength and thermal dimensional stability, said composition comprising a normally solid thermoplastic polyester having a saturated polyester backbone and 0.5–10% by weight, based on the polyester, of predominently isotactic polybutene-1 having a weight average molecular weight of 800,000–1,200,000 as determined by light scattering.

2. A composition according to Claim 1, wherein said polyester is polyethylene terephthalate.

3. A composition according to Claim 1, wherein the isotactic polybutene-1 contains at least 97% by weight of isotactic polybutene-1.

4. A composition according to Claim 1, wherein said isotactic polybutene-1 is present in an amount of 2–6% by weight.

5. A composition according to Claim 2, wherein the polyethylene terephthalate contains at least 90 mole percent terephthalic acid as an acid component and at least 90 mole percent ethylene glycol as a polyhydric alcohol component.

6. A composition according to Claim 5, wherein said polyethylene terephthalate has a melt viscosity of about $3.5 \times 10$ to $7 \times 10^3$ poises, as determined at 285° C., with a length:diameter ratio of 10:1 and a shear rate of $10^3$ sec.$^{-1}$.

7. A composition according to Claim 1, wherein said polyester is crystalline.

8. A composition according to Claim 1, wherein said polybutene-1 is a copolymer containing up to 10 mole percent of an α-olefin.

9. A composition of Claim 1, further comprising at least one additive selected from the group consisting of pigments, crystallization accelerators, mold release agents, reinforcing agents, and impact strength improving agents.

10. A shaped object having improved notch impact strength and thermal dimensional stability as compared to objects molded of the same polyester component without an isotactic polybutene-1 additive, said shaped object being prepared by molding a composition according to Claim 1.

11. A shaped object according to Claim 10, wherein the polyester is polyethylene terephthalate containing at least 90 mole percent terephthalic acid as an acid component and at least 90 mole percent ethylene glycol as a polyhydric alcohol component.

References Cited

UNITED STATES PATENTS 3,361,848  1/1968  Siggel _____ 260—873

WILLIAM H. SHORT, Primary Examiner

T. E. PERTILLA, Assistant Examiner

U.S. Cl. X.R.

260—40 R

UNITED STATES PATENT OFFICE
CERTIFICATE OF CORRECTION

Patent No. 3,839,499      Dated October 1, 1974

Inventor(s) Hans Jadamus, et al.

It is certified that error appears in the above-identified patent and that said Letters Patent are hereby corrected as shown below:

IN THE CLAIMS:

CLAIM 6, LINE 3 OF THE CLAIM, COLUMN 6:

"3.5 x 10" should read -- $3.5 \times 10^3$ --.

Signed and sealed this 26th day of November 1974.

(SEAL)
Attest:

McCOY M. GIBSON JR.
Attesting Officer

C. MARSHALL DANN
Commissioner of Patents